Feb. 28, 1967

R. BROWN 3,306,153

SELF-THREADING BOLT

Filed June 29, 1964

INVENTOR.
ROBERT BROWN
BY
Charles L. Lovercheck
attorney

3,306,153
SELF-THREADING BOLT
Robert Brown, Erie, Pa., assignor to Niagara Plastics Company, Erie, Pa., a corporation of Pennsylvania
Filed June 29, 1964, Ser. No. 378,865
1 Claim. (Cl. 85—1)

This invention relates to bolts and, more particularly, to self-threading bolts.

The self-threading bolt disclosed herein is made of a material which can be readily self-threaded in a suitable female threaded member and is preferably made of a molded plastic material such as polyethylene.

The bolt has a hollow cylindrical body with two spaced parallel, flat, webs integrally attached to the inside of the wall and to the end which provide a space which may receive a large screw driver or other suitable tool to remove the bolt from the member in which it is received.

The bolt may be made in various sizes and may be made at least as small as one quarter inch diameter and may be made a maximum size of one inch or even much larger where the application demands.

It is, accordingly, an object of the present invention to provide an improved self-threading bolt.

Another object of the invention is to provide a self-threading bolt which is simple in construction, economical to manufacture, and simple and efficient to use.

A further object of the invention is to provide an improved bolt in combination with a reinforcing and tool receiving structure.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 2:
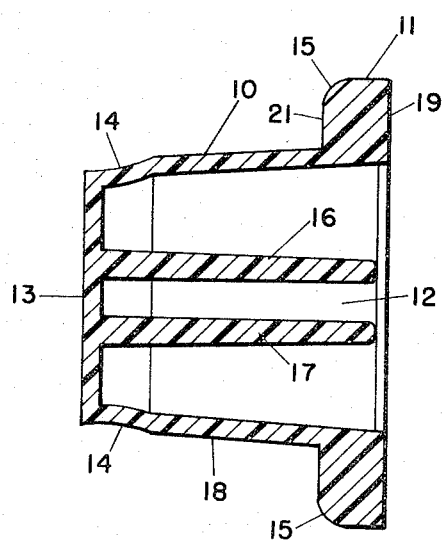
FIG. 2 is a cross sectional view taken on line 2—2 of FIG. 1.
Figure 1:
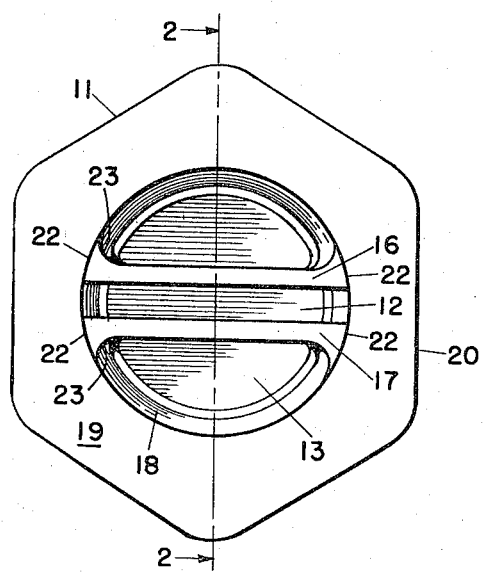
FIG. 1 is an end view of a bolt according to the invention.

Now with more particular reference to the drawing, the bolt has the generally cylindrical body 10 which has a tapered side wall 18 which tapers from the flanged end 15 toward the closed end 13. The side wall 18 has only a slight taper which provides two advantages. First, the taper makes it easier to tighten a nut on the bolt and, secondly, it provides draft in the molding machine.

The starting base portion 14 has a greater taper than the side wall 18. This portion is tapered inwardly and toward the closed end 13 of the belt and could be said to be generally frusto-conical in shape.

The closed end 13 is generally flat as shown; however, it could be convex or even concave to suit individual applications. The flange 11 is integrally attached to the body and extends radially outwardly. It has a flat outer end 19 and outside edge surfaces 20 may define a hexagon to receive a suitable wrench or the like. The flange may have a chamfer 15 of suitable radius and has a flat surface 21 which may abut against surface to be secured.

Webs 16 and 17 are generally flat or plate like and they are integrally attached at their edges at 22 to the inside of the inner periphery of the body and they define a tool receiving space 12 therebetween in which a tool such as a large screw driver may be inserted to rotate the bolt.

The inside of the body is generally cylindrical as shown but it might be considered to be slightly frusto-conical since it defines a slight taper generally concentric to the outside wall. The webs may have a slight radius at 23 which provides strength. It does not obstruct the space between the webs.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

A self-threading bolt comprising
a generally cylindrical hollow body with a closed end, and an outwardly directed flange integrally attached to the end of said body opposite said closed end,
said generally cylindrical body including a first portion tapering inwardly from said flange toward said closed end and having a second portion adjacent said closed end having a greater taper than said first portion,
said hollow body having two spaced flat webs therein disposed generally parallel to each other and to a diameter of said hollow body and equally spaced on either side of said diameter,
said webs being integrally attached at their sides to the inner periphery of said body and integrally attached at their ends adjacent said closed end to the inside of said end of said body,
said webs terminating substantially flush with the open end of said hollow body,
said spaced webs defining a space for receiving a tool whereby said bolt may be rotated to thread it or unthread it into or out of a female threaded member,
said body being made of a material adapted to be self-threaded on its external, tapered surfaces when inserted in a threaded opening in a mating member made of a harder material,
said material being taken from the group of polyethylene and vinyl,
said flange having flat edges on the outside thereof defining a hexagon for receiving a wrench.

References Cited by the Examiner
UNITED STATES PATENTS

| | | | |
|---|---|---|---|
| 992,928 | 5/1911 | Walcott | 215—49 |
| 1,674,998 | 6/1928 | Spang. | |
| 2,551,834 | 5/1951 | Ferguson. | |
| 3,169,439 | 2/1965 | Rapata | 151—41.75 |

FOREIGN PATENTS 374,804  6/1907  France.

CARL W. TOMLIN, *Primary Examiner.*

EDWARD C. ALLEN, *Examiner.*

RAMON S. BRITTS, *Assistant Examiner.*